United States Patent
Loeser et al.

(10) Patent No.: US 9,787,168 B2
(45) Date of Patent: Oct. 10, 2017

(54) LINEAR SYNCHRONOUS MOTOR

(71) Applicants: Friedrich Loeser, Riemerling (DE); Qinghua Zheng, Munich (DE)

(72) Inventors: Friedrich Loeser, Riemerling (DE); Qinghua Zheng, Munich (DE)

(73) Assignee: THYSSENKRUPP ELEVATOR AG, Essen (DE)

( * ) Notice: Subject to any disclaimer, the term of this patent is extended or adjusted under 35 U.S.C. 154(b) by 80 days.

(21) Appl. No.: 14/363,867

(22) PCT Filed: Dec. 3, 2012

(86) PCT No.: PCT/EP2012/074217
§ 371 (c)(1),
(2) Date: Jun. 9, 2014

(87) PCT Pub. No.: WO2013/083514
PCT Pub. Date: Jun. 13, 2013

(65) Prior Publication Data
US 2014/0368062 A1 Dec. 18, 2014

(30) Foreign Application Priority Data

Dec. 9, 2011 (DE) .................. 10 2011 056 249

(51) Int. Cl.
*H02K 41/03* (2006.01)
*B60L 13/03* (2006.01)
*B60L 13/00* (2006.01)

(52) U.S. Cl.
CPC ............ *H02K 41/031* (2013.01); *B60L 13/03* (2013.01); *H02K 41/03* (2013.01); *B60L 13/00* (2013.01);
(Continued)

(58) Field of Classification Search
CPC ...... B60L 2200/26; B60L 13/10; B60L 13/03; B60L 13/04; B60L 13/00; B60L 13/006;
(Continued)

(56) References Cited

U.S. PATENT DOCUMENTS 3,712,240 A   1/1973   Donlon et al.
3,792,665 A * 2/1974   Nelson .................. B60L 15/005
                                                      104/292
(Continued)

FOREIGN PATENT DOCUMENTS

DE   EP 2131484 A1 * 12/2009 .......... H02K 41/031
EP   0 858 965 A1   8/1998
(Continued)

OTHER PUBLICATIONS

German language International Search Report (ISR) for International Application No. PCT/EP2012/074217 dated Jul. 28, 2014.
(Continued)

*Primary Examiner* — Bernard Rojas
*Assistant Examiner* — Alexander Singh
(74) *Attorney, Agent, or Firm* — thyssenkrupp North America, Inc.

(57) ABSTRACT

Disclosed is a linear synchronous motor comprising an elongate stator extending in a longitudinal direction and having a plurality of coil windings, and a runner having a multiplicity of successive magnets disposed along the length thereof the longitudinal direction. The elongate stator has a plurality of elongate-stator segments arranged successively in the longitudinal direction, with each elongate-stator segment separated from the next successive elongate-stator segment by a gap. A total section length of one elongate-stator segment and an adjacent gap is a constant value over a plurality of successive elongate-stator segments, wherein a runner length measured in the longitudinal direction across (Continued)

all magnets successively disposed on the runner, is an integer multiple of the total section length.

18 Claims, 2 Drawing Sheets

(52) U.S. Cl.
CPC ........ *B60L 13/006* (2013.01); *H02K 2213/12* (2013.01)

(58) Field of Classification Search
CPC ...... B60L 15/00; H02K 41/03; H02K 41/031; H02K 2213/12
USPC ......... 310/12.09, 12.15, 12.11, 12.18, 12.21, 310/12.24; 104/282, 283, 288, 290, 292
See application file for complete search history.

(56) References Cited

U.S. PATENT DOCUMENTS

| | | | | |
|---|---|---|---|---|
| 3,858,522 A | * | 1/1975 | Maki | ........................ B60L 13/10 104/282 |
| 5,497,038 A | | 3/1996 | Sink | |
| 6,189,657 B1 | | 2/2001 | Jessenberger | |
| 7,019,421 B1 | * | 3/2006 | Hall | ................... B66B 11/0407 187/251 |
| 7,291,953 B1 | * | 11/2007 | Smith | .................... H02K 41/03 310/112 |
| 7,633,188 B2 | * | 12/2009 | Kitade | ................... H02K 41/03 310/12.23 |
| 2011/0062901 A1 | | 3/2011 | Busch | |

FOREIGN PATENT DOCUMENTS

| | | |
|---|---|---|
| EP | 1056187 A1 | 11/2000 |
| WO | 2009/132729 A2 | 11/2009 |
| WO | 2009/146821 A1 | 12/2009 |

OTHER PUBLICATIONS

English translation of International Search Report (ISR) for International Application No. PCT/EP2012/074217 dated Jul. 28, 2014.
German language International Preliminary Report on Patentability (IPRP) Chapter I, with the Written Opinion of the ISA, for International Application No. PCT/EP2012/074217 dated Aug. 12, 2014.
English translation of International Preliminary Report on Patentability (IPRP) Chapter I, with the Written Opinion of the ISA, for International Application No. PCT/EP2012/074217 dated Sep. 2, 2014.
English Language Abstract of EP1056187A1.
Raschbichler, Hans Georg, Development Chronology of the Transrapid Maglev System, ZEVrail Magazine (2004).

* cited by examiner

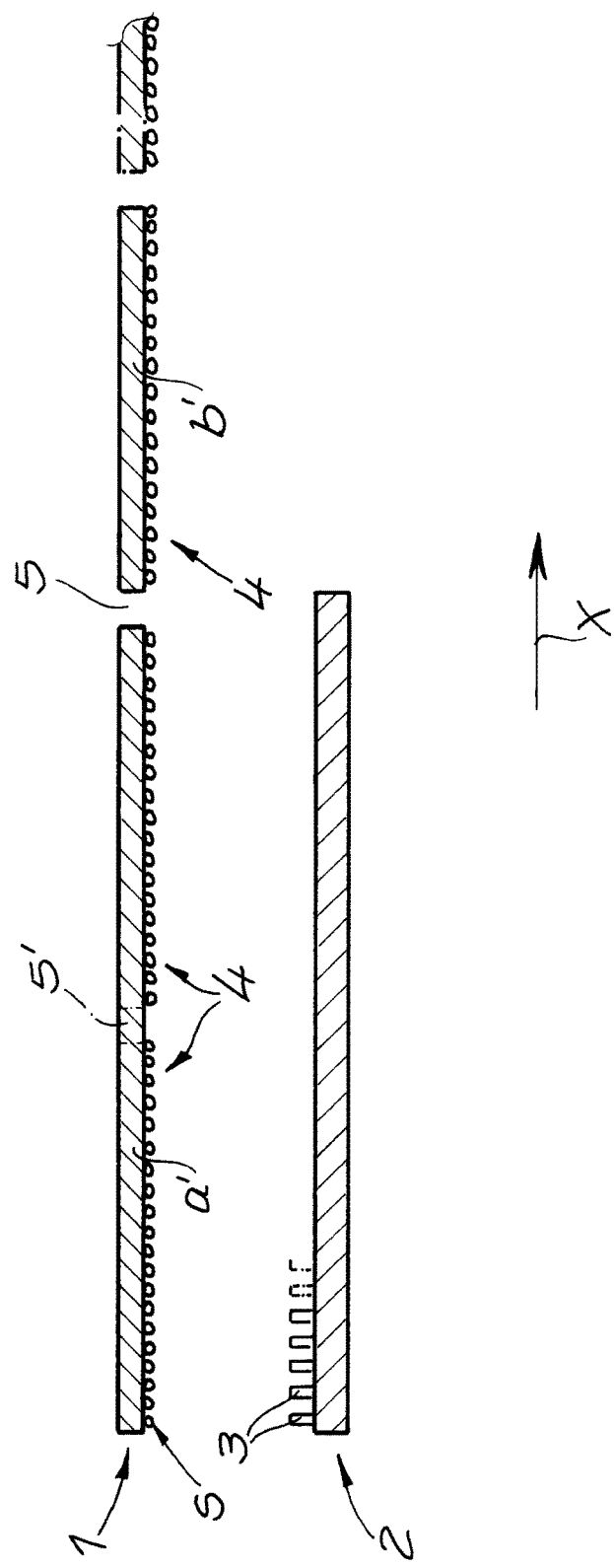

LINEAR SYNCHRONOUS MOTOR

CROSS REFERENCE TO RELATED APPLICATIONS

This application is a U.S. National Stage Entry of International Patent Application Serial Number PCT/EP2012/074217, filed Dec. 3, 2012.

FIELD

The invention relates to a linear synchronous motor, having an elongate stator which has coil windings and having a runner which has a multiplicity of successive magnets in the longitudinal direction of the linear synchronous motor, wherein the elongate stator is formed from a multiplicity of elongate-stator sections which each have multiple coil windings arranged in succession in the longitudinal direction and which are separated from one another by gaps. The invention also relates to preferred uses of the linear synchronous motor.

BACKGROUND

Linear synchronous motors are used in practice as drives for a wide variety of applications and in a wide range of different dimensions. Aside from linearly driven advancing devices in machine tools or positioning systems, linear synchronous motors are also used for transportation systems such as magnetic levitation railroads.

In particular, in the case of short travels, use is made of short-stator linear motors in which the travel path, as the positionally fixed component, is equipped with magnets of alternating polarity. The primary part of the motor is then formed by drive windings of the moving component, for example the vehicle that is moved along a travel path. Short-stator linear motors are commonly used in linear drives in machine tools, wherein the alternating field provided for propulsion can be supplied to the moving component for example by means of a movable cable. A short-stator linear motor is known for example from EP 1 056 187 A1. In the case of short-stator linear motors that have only a short travel, the positionally fixed component that is equipped with magnets is commonly manufactured as a single coherent part.

If, however, it is sought to cover relatively great distances at high speeds, use is made in practice of elongate-stator synchronous motors. For example, a linear synchronous motor having an elongate stator which has coil windings and having a runner is known from the periodical ZEVrail, special edition October 2003, pages 10 to 16. In the case of an elongate-stator synchronous motor of said type, the elongate stator, as the positionally fixed component, is manufactured in parts and then installed. Even though the arrangement of said elongate-stator sections is performed with very high accuracy, local discontinuities are unavoidable over the entire motor distance. Accordingly, gaps are provided between the elongate-stator sections arranged in succession in the longitudinal direction, which gaps are necessary for the installation, maintenance and exchange of the elongate-stator sections and in order to make it possible for expansions and deformations, which may for example be attributable to a thermal change in length or a movement of the supporting structure, to be compensated. The gaps give rise to a deviation in relation to the otherwise equidistant arrangement of the coil windings of the elongate stator, which deviation leads to force fluctuations during the operation of the linear synchronous motor, this also being referred to as a force undulation. Such force fluctuations may, in the form of shocks or vibrations, lead to considerable losses in comfort, wherein increased mechanical and electrical loading of the motor also arise.

To minimize such disturbances, it is attempted to keep the gaps between successive elongate-stator sections as small as possible through an optimization of the construction. The described force fluctuations however cannot be fully eliminated even with relatively great effort with regard to design.

WO 2009/146821 A1 is concerned with the reduction of force fluctuations in a linear synchronous motor, wherein electronic control is proposed for compensation purposes. By means of such electronic compensation, the force fluctuations based on the geometry of the linear synchronous motor can be suppressed, as a result of which the geometry can be maintained unchanged.

U.S. Pat. No. 3,712,240 A describes an asynchronous motor of a different generic type, in which simple conductive plates, for example aluminum plates, are provided as a secondary element. To permit a uniform drive action, it is the intention for the degree of overlap between primary elements and secondary elements to always be constant. In U.S. Pat. No. 3,712,240, no magnets are provided, such that the problem of drops in force caused by individual magnets does not arise.

SUMMARY

Against this background, it is the object of the present invention to specify a linear synchronous motor, having an elongate stator which has coil windings and having a runner, in which gaps remain between successive elongate-stator sections, and wherein, at the same time, excessive force fluctuations as a result of the gaps are avoided.

According to the present disclosure, a linear synchronous motor comprises at least an elongate stator, which has coil windings and a runner with a multiplicity of successive magnets in a longitudinal direction of the linear synchronous motor. The elongate stator is formed from a multiplicity of elongate-stator sections which each have multiple coil windings arranged in succession in the longitudinal direction and which are separated from one another by gaps. Over a multiplicity of successive elongate-stator sections, the overall length of each one elongate-stator section and one adjoining gap is constant, wherein the length measured across all of the magnets of the runner in the longitudinal direction is an integer multiple of the overall length.

BRIEF DESCRIPTION OF DRAWINGS

The present invention is described in detail below with reference to the attached exemplary drawing figures, wherein:

FIG. 2 is an alternate embodiment of the linear synchronous motor of FIG. 1

DETAILED DESCRIPTION

Figure 1:
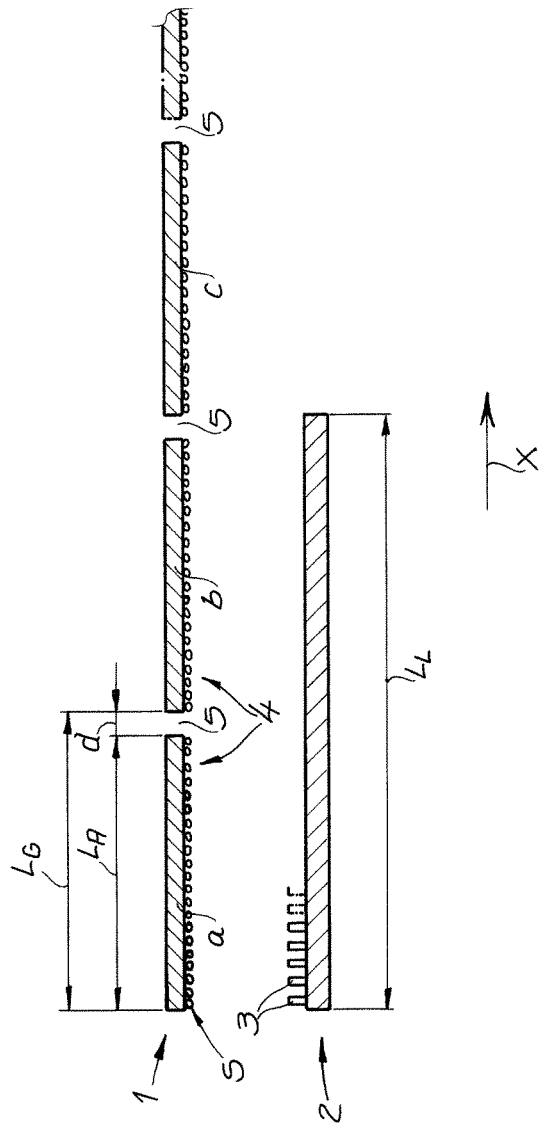
FIG. 1 is a schematic view of an embodiment of a linear synchronous motor of the present disclosure.

Taking a linear synchronous motor having the features described in the introduction as a starting point, the object is achieved according to the invention in that, over a multiplicity of successive elongate-stator sections, preferably over the entire elongate stator, the overall length $L_G$ of in each case one elongate-stator section and one adjoining gap is constant, wherein the length $L_L$ measured over all of the magnets of the runner in the longitudinal direction is an integer multiple of the overall length $L_G$. The following relationship thus applies:

$$L_L = n*L_G = n*(L_A + d)$$

where n is a natural number, that is to say a whole number greater than 0, where $L_A$ is the length of an elongate-stator section, and d is the width of an associated gap.

During a movement, when the rear end of the runner, that is to say the final magnet in the direction of movement, exits the region of a gap, the front end of the runner, that is to say the first magnet of the runner in the direction of movement, passes into the region of a further gap. The number n thus also corresponds to the number of gaps situated directly beneath the runner. The gaps may, though need not imperatively, be air gaps. Within the context of the invention, a gap refers generally to a section which is free from coil windings, wherein the successive coil windings within an elongate-stator section are normally arranged equidistantly with respect to their center or some other reference point. If the individual elongate-stator sections are formed as mutually separate, individually installable modules, the gaps are air gaps if they are not filled with a material, for example a flexible seal. It is however also conceivable for relatively long modules to be used in certain sections of the overall elongate stator, that is to say of the overall travel path. Accordingly, the elongate stator may also have mutually separate, individually installable modules which have at least two elongate-stator sections with a gap arranged in between. Such a gap is then merely a region which is free from coil windings, wherein the module itself is not interrupted here. It is crucial within the context of the invention that the above-described length ratios are adhered to.

It is preferable for the described length ratios to be realized along the entire elongate stator. In particular in the case of a very large length, for example an embodiment as a magnetic levitation railroad, however, it may be the case under certain circumstances that said conditions cannot always be adhered to, for example in the region of bends, junctions or other transitions. If it is thus necessary in such regions to deviate from a uniform overall length $L_G$ of in each case one elongate-stator section and one adjoining gap, the load on the linear synchronous motor may be kept low in some other way if necessary. For example, the drive speed may be reduced in said regions.

In the context of the invention, it is possible for gaps to be provided between the elongate-stator sections, without this giving rise to excessive force fluctuations during the operation of the linear synchronous motor. Said gaps permit easy, jamming-free installation and an expansion of the elongate-stator sections under the action of heat. In accordance with the change in length $L_A$ of the elongate-stator sections, the length of the gaps remaining between the elongate-stator sections is varied, such that, according to the invention, the overall length $L_G$ remains constant. However, the length d of the gaps should, within the context of the invention, be limited to a dimension specifically required to permit jamming-free installation and dismantling and a compensation of changes in length. Despite the length coordination according to the invention, there specifically remains a slight residual disturbance which also increases with increasing gap width. It is preferable for the length, measured in the longitudinal direction, of the gaps between the successive elongate-stator sections to be smaller than half of the spacing between successive magnets, said spacing being determined with respect to the respective center of the magnets. It can thereby be ensured that the occurring fluctuations are normally restricted to approximately the length of one magnet or to the overhang of two successive magnets.

In one preferred embodiment of the invention, the magnets of the runner have alternating polarity as viewed in the longitudinal direction. In accordance with the normal configuration of a linear synchronous motor, the pole orientation of the magnets is perpendicular to the load-bearing gap between elongate stator and runner.

If, in accordance with a further preferred embodiment of the invention, the runner has an even number of magnets, the first magnet and the final magnet in the direction of movement during a movement of the runner are of opposite polarity. Said opposite polarity also assists in achieving that the fluctuations, arising as a result of gaps being traveled over, at the front end of the runner as viewed in the direction of movement and at the rear end of the runner substantially cancel one another out.

Depending on the application, the magnets of the runner may be permanent magnets composed of a magnetic material, or may be electromagnets. Even in the case of an embodiment as electromagnets, these generally have an approximately constant direct current applied to them in order to ensure a uniform excitation field.

Proceeding from a mean field strength, a change in the coil currents of the electromagnets is normally implemented in order to provide a constant load-bearing gap between the elongate stator and the runner. In practice, gap sensors are used for monitoring the load-bearing gap, wherein the load-bearing gap is normally approximately 10 mm in the case of a magnetic levitation railroad.

In particular if there is no need for a regulated excitation field, permanent magnets may also be provided on the runner. Finally, a combination of permanent magnets and electromagnets is also conceivable, wherein, with regard to the load-bearing function, the permanent magnets cover a base load, and wherein an adaptation is possible as required by means of the electromagnets.

The invention also relates to the use of the described linear synchronous motor for a magnetic levitation railroad. The elongate stator then forms the travel path, wherein the runner is part of the magnetic levitation vehicle.

In an alternative use of the linear synchronous motor, it is provided that the latter is used as a drive of an elevator within a building. The elevator is in particular a freight elevator or passenger elevator. Specifically if it is sought to cover great heights in tower blocks or other building structures, it is expedient for the elongate stator to be formed not from a single piece but from elongate-stator sections. Furthermore, with increasing height, a relatively high speed of the elevator is also desired, wherein it is specifically in this case that force fluctuations, also referred to as a force undulation, are disadvantageous. Finally, in the case of the linear synchronous motor being used for an elevator, the runner is relatively short, such that force fluctuations at individual magnets can lead to a considerable disturbance. The length adaptation or segmentation of the elongate stator according to the invention is therefore expedient specifically if the linear synchronous motor is used for an elevator within a building.

FIG. 1 shows, in a schematic illustration, a linear synchronous motor having an elongate stator 1, only one section of which is illustrated and which has equidistant coil windings S. The elongate stator 1 may for example be the travel path of a magnetic levitation railroad, or a static drive element of an elevator that is driven by the linear synchronous motor.

The linear synchronous motor furthermore comprises a runner 2 which has a multiplicity of successive magnets 3 in the longitudinal direction of the linear synchronous motor. The elongate stator 1 thus forms the positionally fixed primary part, whereas the movable runner 2 forms the secondary part of the linear synchronous motor. In the case of a magnetic levitation railroad, the runner 2 is thus part of the vehicle that is moved along the elongate stator 1 as travel path.

The linear synchronous motor according to the invention is designed for great lengths, for which reason the elongate stator 1 is formed from a multiplicity of elongate-stator sections 4 which are each produced and installed as separate modules a, b, c. The elongate-stator sections 4 each have multiple coil windings S arranged in succession in the longitudinal direction x, wherein said coil windings S may be formed along the individual magnets 3 as conductors running in a transverse direction, which conductors, when subjected to an alternating-current voltage, generate a field that progresses along the elongate stator 1, and thus move the runner 2.

By virtue of the fact that the elongate stator 1 is assembled from a multiplicity of elongate-stator sections 4, said elongate stator may also have a very great length. To permit easy installation, maintenance and dismantling of the individual elongate-stator sections 4, and in order to permit compensation of changes in length, gaps 5 are provided between the elongate-stator sections 4. According to the invention, the overall length $L_G$ of in each case one elongate-stator section 4 with the length $L_A$ and one adjoining gap with the length d is constant along multiple elongate-stator sections 4, preferably along the entire elongate stator 1. For example, if the length $L_A$ of the elongate-stator sections 4 increases owing to a thermal expansion, the length d of the gaps 5 correspondingly decreases. Allowance must be made here not only for the ambient temperature but also for the waste heat of the coil windings S during the operation of the linear synchronous motor.

It also emerges from FIG. 1 that, according to the invention, the length $L_L$ of the runner, as measured over all of the magnets 3 of the runner 2, is an integer multiple of the overall length $L_G$. In the illustrated exemplary embodiment, the length $L_L$ of the runner 2 is twice as large as the overall length $L_G$.

Within the context of the described embodiment, it is achieved that there are always arranged two gaps 5 along the runner 2 as secondary part. When the magnet 3 arranged at the rear end of the runner 2 as viewed in the direction of movement x exits the region of a gap 5, the front end of the runner 2, that is to say the first magnet 3 as viewed in the direction of movement, passes into the region of a further gap 5. It is achieved in this way that the force fluctuations, also referred to as a force undulation, arising as a result of the gaps 5 being traveled over substantially cancel one another out during the operation of the linear synchronous motor according to the invention. This is also contributed to by the fact that the first magnet 3 as viewed in the direction of movement and the final magnet 3 as viewed in the direction of movement have opposite polarities. This is achieved in that the magnets 3 of the runner 2 have alternating polarity as viewed in the longitudinal direction x, wherein the runner 2 also has an even number of magnets 3.

Within the context of the invention, the magnets 3 of the runner may be electromagnets or permanent magnets.

Finally, a combination of both magnet types is also possible, wherein electromagnets also permit control of the field strength, for example in order to make it possible for a load-bearing gap between elongate stator 1 and runner 2 to be regulated.

In the exemplary embodiment as per FIG. 1, the individual elongate-stator sections 4, as modules a, b, c, are separated from one another by an air gap. It may however be expedient, depending on the application, for longer modules or modules of different length to be provided. Said modules of increased length then have multiple elongate-stator sections 4 which are each separated from one another by a gap 5. Accordingly, figure shows an embodiment with two different modules a' and b', wherein the second module b' is of the same design as the modules a, b, c illustrated in FIG. 1. The other module a' illustrated in FIG. 2 is however formed by two elongate-stator sections 4 with a gap 5' remaining in between. Within the context of the invention, a gap 5, 5' thus refers generally to a region which is free from coil windings S. Accordingly, FIG. 2 shows an elongated, continuous module a' in which the gap 5' is a coil-free section of the continuous module a'. Furthermore, a gap 5 is provided between the modules a', b', which gap is a simple air gap as in the embodiment of FIG. 1. The linear synchronous motor according to the invention may be used in particular for a magnetic levitation railroad or an elevator within a building.

The invention claimed is:

1. A linear synchronous motor, comprising:
an elongate stator extending in a longitudinal direction and having a plurality of coil windings, said elongate stator having a plurality of elongate-stator sections successively arranged in the longitudinal direction and separated from each other by a plurality of gaps disposed there between, each elongate-stator section including a plurality of coil windings disposed thereon; and
a runner disposed opposite said elongate stator, extending in the longitudinal direction, and having a plurality of magnets successively disposed along a length thereof in the longitudinal direction,
wherein an overall section length $L_G$ is a constant value and is defined as the length of one each of the plurality of elongate-stator sections and adjacent gaps, and
wherein a runner length $L_L$, defined as the length measured in the longitudinal direction across all magnets successively disposed on the runner, is an integer multiple of the overall section length $L_G$,
wherein a length of each of the gaps disposed between the successive elongate-stator sections are less than half of a distance between centerlines of successive magnets disposed on said runner.

2. The linear synchronous motor of claim 1, wherein the magnets have alternating polarity as viewed in the longitudinal direction.

3. The linear synchronous motor of claim 1, characterized in that the runner has an even number of magnets disposed thereon.

4. The linear synchronous motor of claim 1, wherein the magnets disposed along the runner are permanent magnets.

5. The linear synchronous motor of claim 1, wherein at least some of the elongate-stator sections are formed as mutually separate, individually installable modules.

6. The linear synchronous motor of claim 1, wherein the elongate stator further has a plurality of mutually separate, individually installable modules, in which at least a portion of the modules include at least two elongate-stator sections having a gap disposed there between.

7. The linear synchronous motor of claim 1, configured to be used with a magnetic levitation railroad.

8. The linear synchronous motor of claim 1, configured to be used with an elevator within an elevator shaft.

9. A linear synchronous motor, comprising:
a plurality of elongate-stator sections successively arranged in a longitudinal direction, each having a plurality of coil windings disposed thereon, each of said plurality of elongate-stator sections being separated from the next successive elongate-stator section by an adjacent gap disposed there between, wherein a sum of the longitudinal lengths of one each of the elongate-stator sections and adjacent gaps is a constant value that defines an overall elongate-stator section length;
a runner disposed opposite said elongate stator, extending in the longitudinal direction; and
a plurality of magnets successively disposed along a length of said runner in the longitudinal direction, wherein a longitudinal distance between a leading edge of a first magnet and a trailing edge of a last successive magnet in said plurality of magnets defines a runner length, which is an integer multiple of the overall elongate-stator section length,
wherein a length of each of the gaps disposed between successive elongate-stator sections is less than half of a distance between centerlines of successive magnets disposed on said runner.

10. The linear synchronous motor of claim 9, wherein the magnets have alternating polarity as viewed in the longitudinal direction.

11. The linear synchronous motor of claim 9, characterized in that the runner has an even number of magnets disposed thereon.

12. The linear synchronous motor of claim 9, wherein the magnets disposed along the runner are permanent magnets.

13. The linear synchronous motor of claim 9, wherein at least a portion of the elongate-stator sections are formed as mutually separate, individually installable modules.

14. The linear synchronous motor of claim 13, wherein at least a portion of the modules include at least two elongate-stator sections having a gap disposed there between.

15. The linear synchronous motor of claim 9, configured to be used with a magnetic levitation railroad.

16. The linear synchronous motor of claim 9, configured to be used with an elevator within an elevator shaft.

17. The linear synchronous motor of claim 9 wherein the plurality of coil windings disposed on each elongate-stator section are arranged successively in the longitudinal direction.

18. A linear synchronous motor, comprising:
an elongate stator extending in a longitudinal direction and having a plurality of coil windings, said elongate stator having a plurality of elongate-stator sections successively arranged in the longitudinal direction and separated from each other by a plurality of gaps disposed there between, each elongate-stator section including a plurality of coil windings arranged successively in the longitudinal direction; and
a runner disposed opposite said elongate stator, extending in the longitudinal direction, and having a plurality of magnets successively disposed along a length thereof in the longitudinal direction,
wherein an overall section length $L_G$ is a constant value and is defined as the length of one each of the plurality of elongate-stator sections and adjacent gaps, and
wherein a runner length $L_L$, defined as the length measured in the longitudinal direction across all magnets successively disposed on the runner, is an integer multiple of the overall section length $L_G$,
wherein a length of each of the gaps disposed between the successive elongate-stator sections is less than half of a distance between centerlines of successive magnets disposed on the runner.

* * * * *